United States Patent [19]

Young et al.

[11] Patent Number: 5,538,314
[45] Date of Patent: Jul. 23, 1996

[54] AUTO WINDOW MOLDING

[75] Inventors: Jack D. Young, Montgomery County; Bradley M. Gross, Miami County, both of Ohio

[73] Assignee: Creative Extruded Products, Inc., Tipp City, Ohio

[21] Appl. No.: 349,301

[22] Filed: Dec. 5, 1994

[51] Int. Cl.⁶ .................................................. B60J 1/00
[52] U.S. Cl. .................. 296/146.15; 296/93; 296/96.21; 52/204.597
[58] Field of Search ....................... 296/93, 201, 146.15, 296/96.21; 52/208, 204.591, 204.597; 49/484.1, 495.1

[56] References Cited

U.S. PATENT DOCUMENTS

| | | | |
|---|---|---|---|
| 4,950,019 | 8/1990 | Gross | 296/93 |
| 5,032,444 | 7/1991 | Desir, Sr. | 428/122 |
| 5,044,684 | 9/1991 | Yada | 296/93 |
| 5,154,028 | 10/1992 | Hill et al. | 52/208 |
| 5,311,711 | 5/1994 | Desir, Sr. | 52/208 |
| 5,317,835 | 6/1994 | Dupuy et al. | 49/441 |
| 5,338,087 | 8/1994 | Gross et al. | 296/146.15 |
| 5,396,746 | 3/1995 | Whitmer | 296/93 X |
| 5,449,544 | 9/1995 | Ogawa et al. | 428/122 |

FOREIGN PATENT DOCUMENTS

| | | | |
|---|---|---|---|
| 304694 | 8/1988 | European Pat. Off. | 52/208 |
| 3305257 | 8/1984 | Germany | 296/146.15 |
| 166517 | 8/1985 | Japan | 52/204.597 |
| 087831 | 3/1992 | Japan | 296/93 |
| 2138479 | 10/1984 | United Kingdom | 296/146.15 |

*Primary Examiner*—Dennis H. Pedder
*Attorney, Agent, or Firm*—Reuben Wolk

[57] ABSTRACT

A decorative molding for use as a seal around a fixed automobile window, also referred to as a reveal molding or header lace, having integral members which serve as spacers to stand the molding off from the body panel, for the purpose of minimizing irregularities in the manufacture of the molding, and also to minimize undesirable noises during driving. The molding is primarily composed of an elastomeric material such as polyvinyl chloride, co-extruded with flexible elastomeric foam members which contact the body panel.

8 Claims, 1 Drawing Sheet

AUTO WINDOW MOLDING

BACKGROUND OF THE INVENTION

The present invention relates to a decorative molding for automobiles, particularly to the application of a molding to a fixed window such as the rear window, or portions of the windshield. This molding is also referred to as "reveal molding" or "header lace". The molding is used to retain the window and to conceal the space between the edge of the window and the adjacent body panel. Such moldings often have irregularities after fabrication and may exhibit undesirable cosmetic effects, such as a wavy appearance. Also, the tip portion of the molding which contacts the body panel may flutter when the auto is in motion, thus creating undesirable wind noises.

PRIOR ART STATEMENT

Typical moldings of this type are shown in the following U.S. Pat. No.

| | |
|---|---|
| 4,950,019 | Gross (of common assignment) |
| 5,032,444 | Desir |
| 5,044,684 | Yada |
| 5,311,711 | Desir |
| 5,338,087 | Gross et al (of common assignment) |

However, none of these references utilize the concept of using foamed elastomeric spacers. Yada employs flexible lips for catching moisture, and these lips contact the body panel interior in conjunction with adhesives, but do not possess the same features as Applicants' spacers for the purposes discussed above.

SUMMARY OF THE INVENTION

The decorative header lace molding of the present invention represents an improvement over the prior art by providing integral members in the form of spacers. Unlike the lips of the above referenced Yada patent, these spacers are formed of a foamed elastomeric material. The spacers contact surfaces of the body panel and have sufficient resilience to enable the molding to retain a consistent outer appearance. The spacers further act as a seal between the molding and the body panel to shut off wind movement through the open space of the type of molding shown by Gross and the Desir patents, so that even if the outer body-contacting tip flutters slightly, the passage of wind is blocked.

Accordingly, it is a principal object of the invention to provide a decorative header lace molding for an automobile for concealing the space between a fixed window and an adjacent body panel, having means contacting the body panel which eliminates inconsistencies in the outer appearance of the molding and minimizes undesirable noises.

It is a further object to form such means as spacers which are integral with the molding.

It is another object to co-extrude said molding and spacers in a simple and inexpensive manner.

Other features and objects of the invention will become apparent from the embodiments set forth in the following description and drawings.

DESCRIPTION OF THE PREFERRED EMBODIMENT

Figure 1:
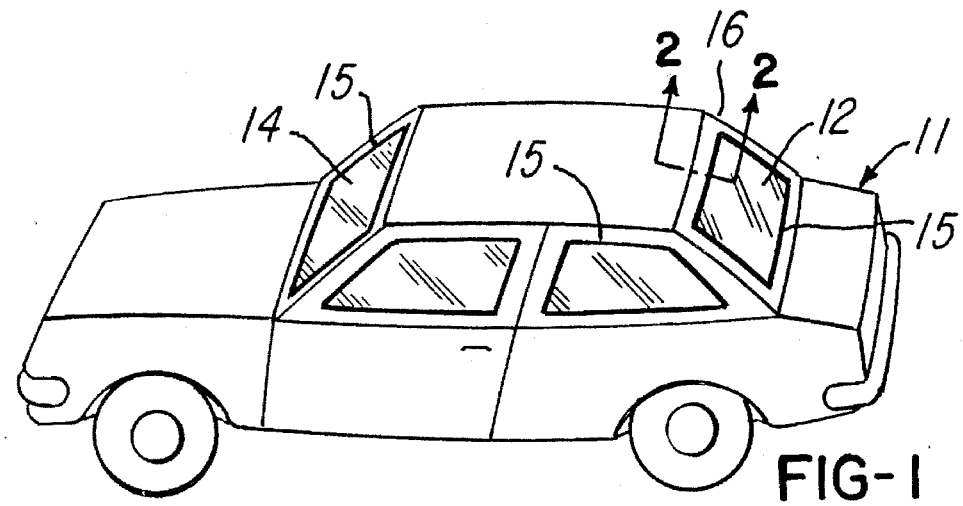
FIG. 1 is a perspective view of a typical auto illustrating various locations of the novel molding.
Figure 2:
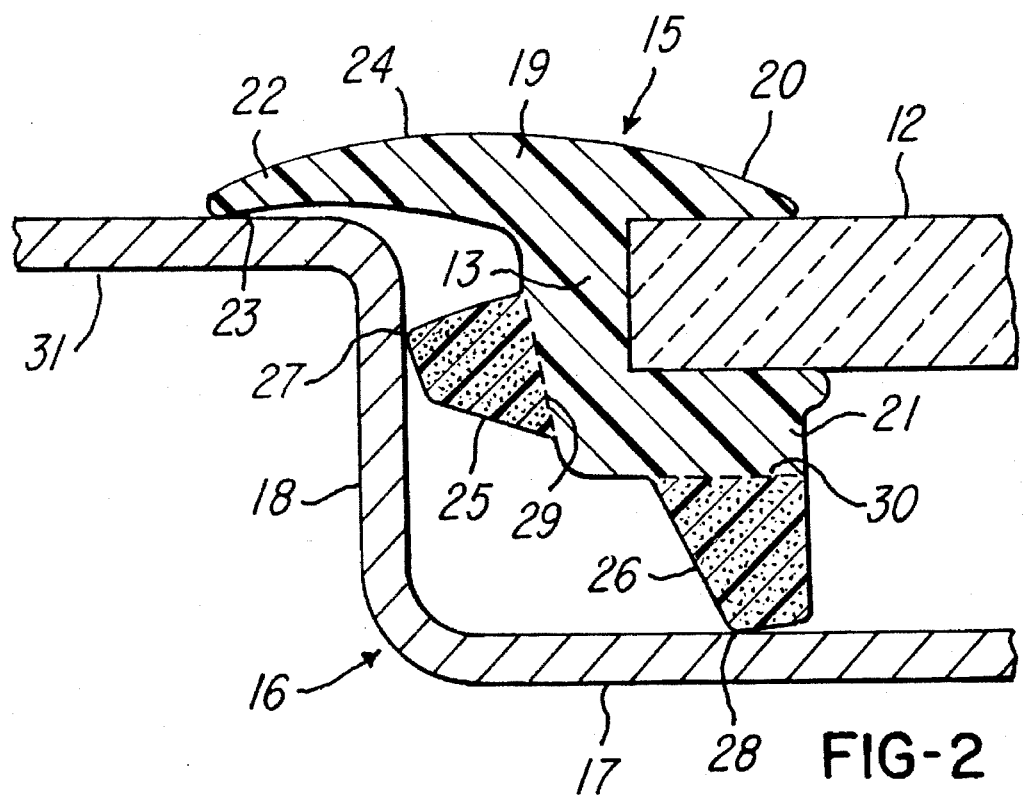
FIG. 2 is an enlarged sectional view taken along lines 2—2 of FIG. 1.

Referring to the drawings, the automobile 11 of FIG. 1 contains, among other parts, a body panel 16, a rear window 12, and a windshield 14. The novel molding 15 is fabricated as a continuous strip for use around the entire rear window, and on the upper and side portions of the windshield. The glass window may be attached to the adjacent body panel by means of an adhesive (not shown) in a manner which is well known in the art. The body panel may assume different configurations, depending on the particular automobile design. In the present example, as shown in FIG. 2, the panel comprises a first section 17 which is shown as horizontal, this section being bent at approximately right angles to form a second section 18, which is therefore in a vertical position. Section 18 is bent again at approximately right angles to form a third section 19 which is approximately parallel to first section 17. The molding 15 is primarily composed of an elastomeric material such as polyvinyl chloride having a hardness of about 80 to 90 Shore A. This material is of the type commonly used in the industry, and may contain filler material. The molding consists of a principal member 13 and has an outer portion 19 for concealing the space between the body panel and the window edge, this portion having a first segment or leg 20 contacting the upper surface of the window edge. Extending from the principal member is a second segment or leg 21 which contacts the lower surface of the window edge. The two segments thus cooperate to grip and retain the window edge. The outer portion 19 has a tip segment 22 extending in a direction opposite to the segment 20, this segment having an inner surface 23 which contacts the body panel 31. Surface 23 may have an inner layer of anti-squeak material such as shown in Gross et al U.S. Pat. No. 5,338,087. The outer portion 19 has an outer surface 24 which is smooth and continuous to provide a decorative exposed surface.

The novel feature of the invention is exemplified by integral means 25 and 26, which are co-extruded with the other portions of the molding, and act as spacers which contact the body panel and space the molding away from the body panel. These integral members or spacers are formed of a flexible elastomeric foamed material, such as polyvinyl chloride, and have a hardness of about 60 Shore A, and extend outwardly from the surfaces of the principal member 13 and the leg 21. The surface 23 of the tip segment 22 contacts section 17 of the body panel to conceal the space. The spacer 25 which extends outwardly from principal member 13, has in polygonal cross-section an outer side with tip 27 which contacts a section of the body panel, while the spacer 26 which extends outwardly from leg 21 is approximately at right angles to spacer 25. The similar tip 28 of spacer 26 contacts body panel section 17. Because of the flexibility of the spacers, they are able to minimize any irregularities in body panel construction as well as in molding construction, thus providing close contact between the molding and the body panel. At the same time, the spacers act as a barrier to prevent wind from passing into the space, thus reducing the volume of undesirable noises when the auto is in motion. The mass provided by the foamed material enhances the flexibility, and also acts as a sound deadener greater than would the use of strips of material of which the remainder of the molding is made. The spacers are co-extruded with the remainder of the molding so that the whole member is unitary. The juncture of the spacers with the principal member 18 and the leg 21 are shown by dash lines designated by reference numbers 29 and 30.

It should be noted that all references to "upper", "lower", "horizontal" and "vertical" in the foregoing description are in relation to the showings in the drawings, However, the moldings are actually oriented in accordance with their relation to the vehicle upon which they are used, The above principal embodiment is merely exemplary, but modifications are contemplated as being within the spirit of the invention.

We claim:

1. In an automobile having a body panel and an adjacent fixed window having a space therebetween, an elastomeric molding comprising a principal member between said body panel and an edge of said window, said molding including an outer portion having a first segment contacting said body panel and concealing said space and a second segment contacting said window edge, said principal member having a leg segment cooperating with said second segment to retain said window edge; the improvement wherein said principal member and said leg segment each have spacing means comprised of a flexible elastomeric foam material and formed as integral portions of each of said principal member and said leg segment and extending outwardly therefrom and contacting said body panel at a tip end of an outer side thereof to maintain spacing between said molding and said body panel, said spacing means being generally polygonal in cross-section.

2. The molding of claim 1 wherein said spacing means have a hardness of approximately 60 Shore A, and the remainder of the molding has a hardness of approximately 80 to 90 Shore A.

3. The molding of claim 1 wherein said spacing means are co-extruded with the remainder of the molding to form a unitary structure.

4. The molding of claim 1 wherein said spacing means extend outwardly at approximately right angles to each other.

5. The molding of claim 1 wherein said body panel has first and second surfaces, said first surface extending at right angles to said second surface, wherein said spacing means on said principal member contacts said first surface, and said spacing means on said leg segment contacts said second body panel surface.

6. In an automobile having a body panel and an adjacent fixed window having a space therebetween, a method of use of a molding for retaining an edge of said window and concealing said space comprising the steps of forming said molding of a principal member and a leg segment comprised of a first elastomeric material, forming spacing means each having a generally polygonal cross-section comprised of a flexible elastomeric foam material as integral members of said principal member and said leg segment, and contacting at a tip end of an outer side thereof separate portions of said body panel with said spacing means for maintaining spacing between said principal member and said body panel.

7. The method of claim 6 comprising the further step of forming said spacing means at approximately right angles to each other.

8. The method of claim 6 comprising the step of co-extruding said spacing means with the remainder of said molding to form a unitary structure.

* * * * *